United States Patent
Eckert et al.

(10) Patent No.: US 9,921,635 B2
(45) Date of Patent: Mar. 20, 2018

(54) DYNAMIC AND ADAPTIVE SLEEP STATE MANAGEMENT

(71) Applicant: Advanced Micro Devices, Inc., Sunnyvale, CA (US)

(72) Inventors: Yasuko Eckert, Kirkland, WA (US); Manish Arora, Dublin, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 633 days.

(21) Appl. No.: 14/068,207

(22) Filed: Oct. 31, 2013

(65) Prior Publication Data

US 2015/0121106 A1  Apr. 30, 2015

(51) Int. Cl.
   *G06F 1/32*  (2006.01)

(52) U.S. Cl.
   CPC .............. *G06F 1/3228* (2013.01); *G06F 1/32* (2013.01); *G06F 1/3203* (2013.01); *G06F 1/324* (2013.01); *G06F 1/3206* (2013.01); *G06F 1/3231* (2013.01); *G06F 1/3246* (2013.01); *Y02B 60/1217* (2013.01); *Y02B 60/1289* (2013.01)

(58) Field of Classification Search
   None
   See application file for complete search history.

(56) References Cited

U.S. PATENT DOCUMENTS

| 8,181,047 | B2* | 5/2012 | Lee ....................... | G06F 1/3228 713/320 |
| 2010/0083017 | A1* | 4/2010 | Fulkerson ............. | G06F 1/3203 713/320 |
| 2010/0332876 | A1* | 12/2010 | Fields, Jr. ............ | G06F 1/3203 713/323 |
| 2011/0040995 | A1* | 2/2011 | Basak ................... | G06F 1/3203 713/324 |
| 2012/0167118 | A1* | 6/2012 | Pingili .................. | G06F 1/3206 719/318 |
| 2013/0097443 | A1* | 4/2013 | Li ......................... | G06F 1/3206 713/322 |
| 2015/0067357 | A1* | 3/2015 | Arora .................... | G06F 1/3206 713/300 |
| 2015/0121057 | A1* | 4/2015 | Arora .................... | G06F 1/3228 713/100 |
| 2015/0121106 | A1* | 4/2015 | Eckert ................... | G06F 1/3228 713/323 |

* cited by examiner

*Primary Examiner* — Tanh Nguyen

(74) *Attorney, Agent, or Firm* — Volpe and Koenig, P.C.

(57) ABSTRACT

An approach is described herein that includes a method for power management of a device. In one example, the method includes sampling duration characteristics for a plurality of past idle events for a predetermined interval of time and determining whether to transition a device to a powered-down state based on the sampled duration characteristics. In another example, the method includes determining whether an average idle time for a plurality of past idle events exceeds an energy break-even point threshold. If the average idle time for the plurality of past idle events exceeds the energy break-even point threshold, a device is immediately transitioned to a powered-down state upon receipt of a next idle event. If the average idle time for the plurality of past idle events does not exceed the energy break-even point threshold, transition of the device to the powered-down state is delayed.

10 Claims, 5 Drawing Sheets

DYNAMIC AND ADAPTIVE SLEEP STATE MANAGEMENT

BACKGROUND

Field

Embodiments described herein generally relate to managing power consumption of a device.

Background

Leakage power is a significant contributor to overall energy consumption in a computing system. In some computing systems reducing leakage power during active times is accomplished by power-gating components within a core of the computing system. Power-gating is a technique that reduces stand-by or leakage power by transitioning a computing system (or individual components of a computing system such as a core and its associated caches) from an active state to a sleep state. In a sleep state, substantially all components of the computing system that are power-gated are powered-down. However, leakage power is also a significant issue when a computer system's processor is idle or halted but not power-gated. The leakage power consumption drops to negligible levels when the processor enters a full-sleep state in which the cores and caches of the computing system are also power-gated.

Power-gating cores and caches is a common technique in current processors. Many applications, both in client and server spaces, have significant idle times during which power-gating can be invoked. These include interactive and I/O-intensive applications. However, optimal power-gating is difficult to achieve. Transitioning between active and full sleep states requires time and energy to flush the caches of the system and move the architectural state of the system into and out of cores. As a result, time and power are consumed while the program makes no forward progress. Entering a full sleep state incurs a performance and energy overhead. Hence, it is desirable that a computing system be in a sleep state for a sufficient amount of time to compensate for the cost. If a computing system is not in a sleep state for a sufficient amount of time, total power can actually increase and negatively impact the computing system. Thus, an ineffective power-gating scheme can sacrifice both performance and energy-consumption of the computing system.

SUMMARY OF THE EMBODIMENTS

Embodiments described herein generally relate to a granular method for power management that includes predicting an optimal time for a computing system to enter a powered-down or sleep state based on characteristics of past sleep states. In some embodiments, the method includes sampling duration characteristics for a plurality of past idle events for a predetermined interval of time and determining whether to transition a device to a powered-down state based on the determined duration characteristics.

In some embodiments, a method includes determining whether an average idle time for a plurality of past idle events exceeds an energy break-even point threshold. If the average idle time for the plurality of past idle events exceeds the energy break-even point threshold, a device is immediately transitioned to a powered-down state upon receipt of a next idle event. If the average idle time for the plurality of past idle events does not exceed the energy break-even point threshold, transition of the device to the powered-down state is delayed.

Further embodiments, features, and advantages of the disclosed embodiments, as well as the structure and operation of the various embodiments are described in detail below with reference to the accompanying drawings.

BRIEF DESCRIPTION OF THE DRAWINGS/FIGURES

The accompanying drawings, which are incorporated herein and form a part of the specification, illustrate the disclosed subject matter and, together with the description, further serve to explain the principles of the contemplated embodiments and to enable a person skilled in the pertinent art to make and use the contemplated embodiments.

Figure 1:
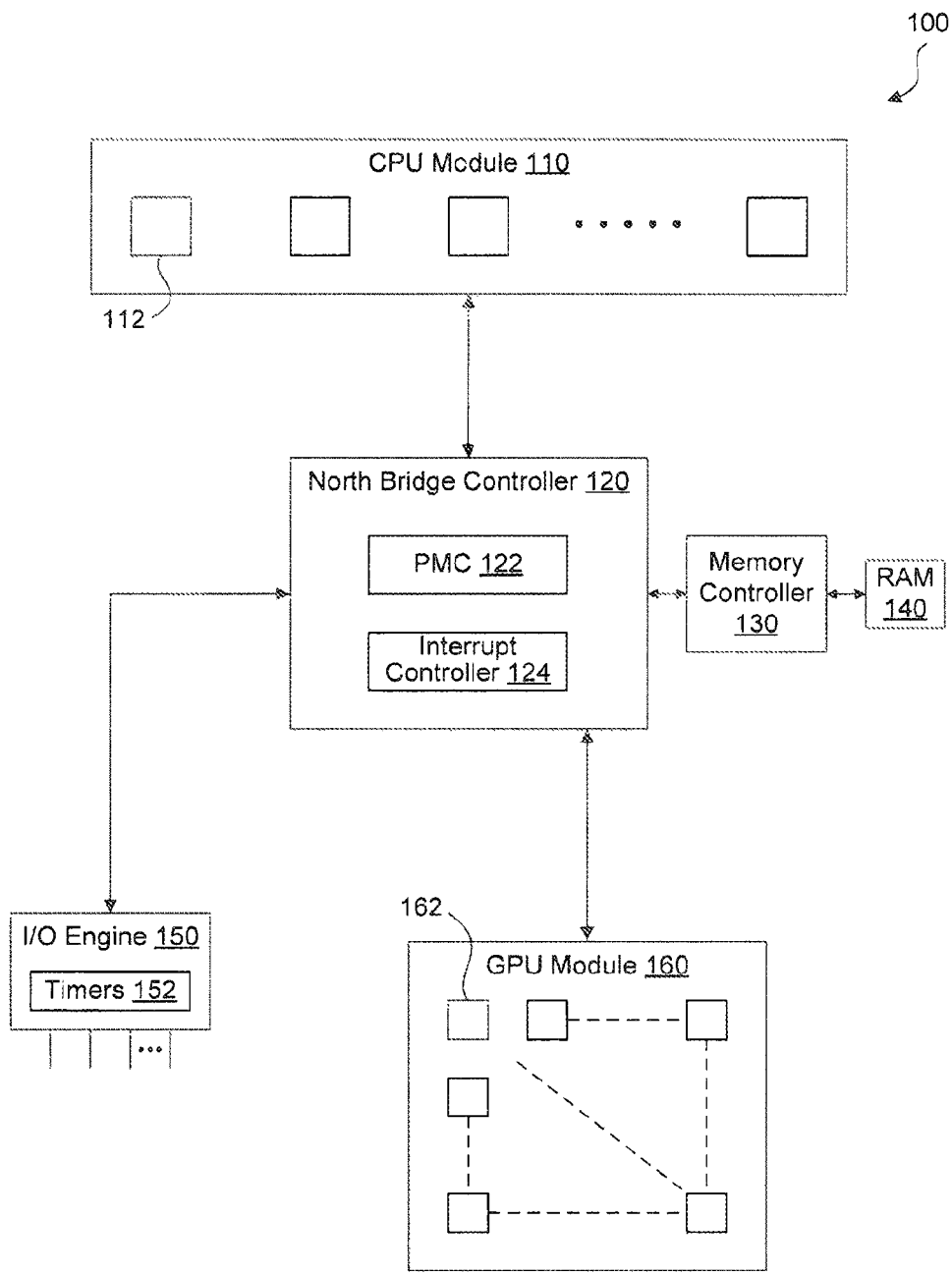
FIG. 1 is a block diagram illustration of a device, according to an embodiment.

The disclosed subject matter will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Power consumption is a significant concern for many different types of computing systems, especially mobile computing systems. To reduce the amount of power that is wasted, the power supplied to a device when it is not executing any tasks can be reduced. For example, in one implementation, an operating system (OS) running on the device controls the device by transitioning it to a sleep state in which substantially all components of the device are powered-down. Idle events generated by a system can occur in an extremely fragmented manner, resulting in many short duration idle events. It is difficult to isolate the events for which power-gating produces the best energy savings for the least performance impact. A reactive scheme that aggressively power-gates every time the core is halted captures the most idle time; however, it also incurs a significant performance penalty if the number of idle events per second is large. Hence, embodiments implement a predictive scheme that attempts to predict the occurrence of long duration idle events which helps to improve energy savings without incurring a significant performance loss.

FIG. 1 illustrates a block diagram of a device 100, according to an embodiment. Device 100 includes a central processing unit (CPU) module 110, a north bridge controller 120, a memory controller 130, a random access memory (RAM) 140, an input/output (I/O) engine 150, and a graphics processing unit (GPU) module 160. The components of device 100 can each be included in discrete circuit packages. In alternate embodiments, one or more of these components can be integrated in the same semiconductor package or the same semiconductor die or can be removed.

CPU module 110 includes CPU cores 112. In an embodiment, CPU cores 112 can each be configured to execute instructions based on one or more operands. The operands can be stored, for example, locally, e.g., in registers of CPU module 110 (not shown in FIG. 1) or in other components of device 100 (e.g., random access memory 140). CPU module 110 can be configured such that different threads of an application are executed on different instances of CPU cores 112 or on the same CPU core.

North bridge controller 120 can be configured to manage communications between the other elements of device 100. For example, north bridge controller 120 can be configured to facilitate memory requests from CPU module 110 to memory controller 130. In an embodiment, north bridge controller 120 is a shared resource between the CPU module 110 and GPU module 160. As shown in FIG. 1, north bridge controller 120 includes a power management controller (PMC) 122 and an interrupt controller 124.

PMC 122 can be configured to manage the adaptive entry into a power-down state of device 100. In an embodiment, PMC 122 is configured to dynamically enter device 100 into a power-down state in a manner that is invisible to the OS, thereby providing increased energy savings while having little performance impact. For example, PMC 122 may be configured to adjust a pre-flush latency for device 100 without the aid of the OS. In an embodiment, a pre-flush latency is the amount of time a power-down process waits before executing the subsequent phases of the process. PMC 122 can be software, hardware, firmware component, or a combination thereof. For example, in an embodiment, PMC 122 can be implemented as a microcontroller including both hardware and firmware. In an alternate embodiment, PMC 122 can be implemented as low level software. The operation of PMC 122 will be described in greater detail below.

Interrupt controller 124 can be used to generate an interrupt for one or more components of device 100 based on a variety of events. For example, interrupt controller 124 can be configured to generate interrupts that act as wakeup events for device 100. In an embodiment, upon receiving communication from a user at input/output engine 150, e.g., a movement of a mouse or key strokes on a keyboard, interrupt controller 124 can generate an interrupt that will awaken device 100 (i.e., transition from a sleep state to an active state).

Memory controller 130 can be configured to control access to RAM 140. For example, the values used in the operation of other components of device 100 can be stored in RAM 140. When these values are needed, the specific component can interact with memory controller 130. Memory controller 130 can be configured to retrieve a requested value and/or update values already stored in RAM 140 based on requests from other devices in device 100.

I/O engine 150 can be used to manage the interaction between device 100 and other devices. For example, I/O engine 150 can be configured to manage communications to/from a user that interacts with device 100 using a communications device, e.g., a keyboard, a mouse, or USB device. As shown in FIG. 1, I/O engine 150 includes timers 152. Timers 152 can be configured to fire at certain, predetermined intervals. For example, an OS of device 100 can configure one or more timers to fire at a predetermined set of intervals to trigger system diagnostic tests on device 100.

GPU module 160 includes clusters 162. Each one of clusters 162 can be used to execute one or more instructions. In an embodiment, GPU module 160 is configured to execute relatively large sets of parallel executions. For example, GPU module 160 can be configured as a single instruction multiple data device (SIMD). In a SIMD, a single instruction is executed on a subset or all of the processing elements with different data. In an embodiment, GPU module 160 can be coupled to a display device, e.g., a screen with a matrix of pixels (not shown in FIG. 1).

Figure 2:
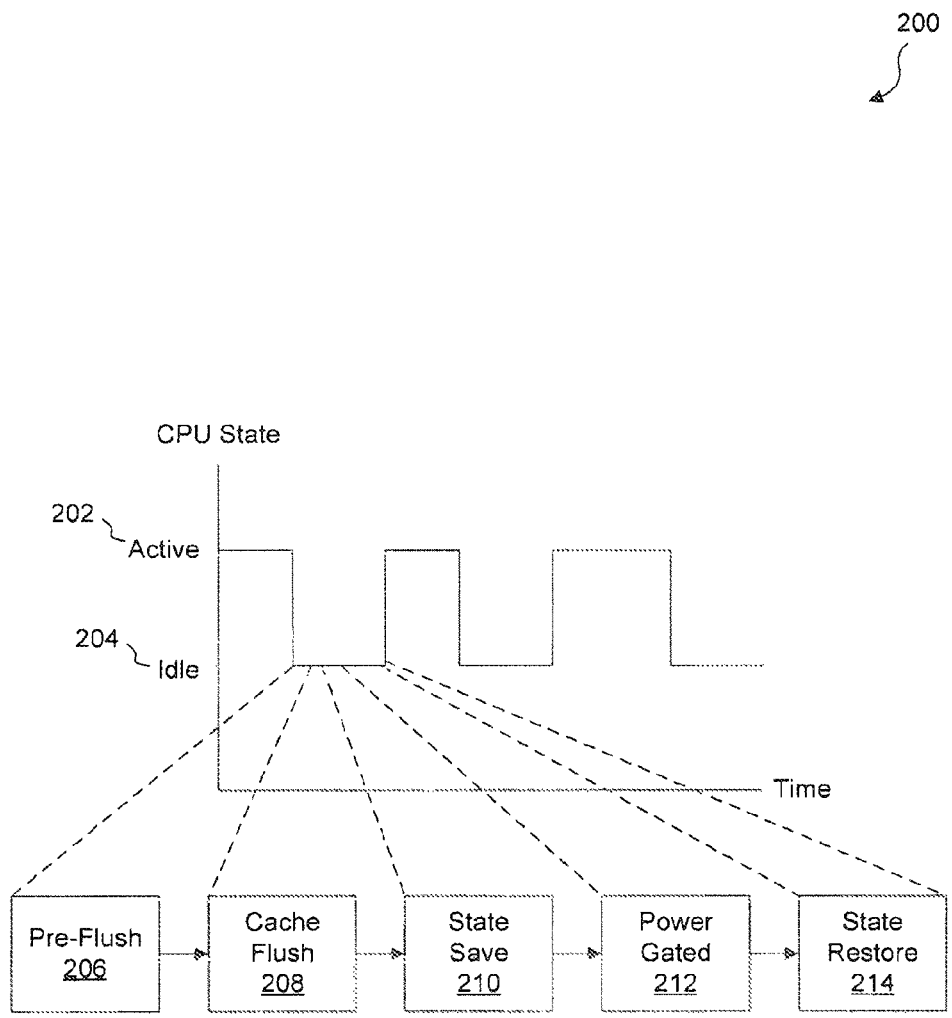
FIG. 2 is, a state diagram illustrating a power-down process, according to an embodiment.

FIG. 2 is a state diagram illustrating the different phases of a power-down process 200, according to an embodiment. For ease of explanation, system 100 in FIG. 1 will be used to describe power-down process 200, but embodiments are not intended to be limited thereto. In an active state 202, all or substantially all of the components of device 100 are fully powered and one or more of the components is active. Activity on device 100 can take many different forms. For example, activity can include one or more of executing tasks in CPU module 110, executing tasks in GPU module 160, managing communications in north bridge controller 120, servicing memory requests in memory controller 130, or managing communications in external devices with I/O engine 150.

Power-down process 200 is initiated upon receipt of an idle event, according to an embodiment. If it is determined that there is no activity on the part of any of the components of device 100 (e.g., none of the components are currently executing a task), then device 100 can be transitioned to an idle state 204. In an embodiment, in the idle state 204, CPU cores 112 may enter "power-gated state," and the voltage provided to CPU cores 112 is reduced to zero. "Power-gating" is a technique in which power is completely shut off to specific portions of a device through the use of, e.g., metal oxide semiconductor (MOS) transistors. For example, the power to specific portions of CPU cores 112 can be substantially reduced or shut off. In an embodiment, the transition between active state 202 and idle state 204 is managed by the PMC 122 of device 100.

It is to be appreciated by one of ordinary skill in the art that the granularity of power-gating components is design-specific and power-gating can be performed on one CPU core alone, multiple CPU cores, GPU SIMDs, caches, and any combination of these.

Power-down process 200 can include a Pre-Flush phase 206, a CacheFlush phase 208, a StateSave phase 210, a PowerGated phase 212 and a StateRestore phase 214. In an embodiment, a pre-flush latency is the amount of time power-down process 200 waits before executing the subsequent phases of the process. Pre-Flush phase 206 uses the pre-flush latency to control the execution of power-down process 200. Pre-flush phase 206 will be discussed in greater detail below. In an embodiment, during CacheFlush phase 208, all modified lines from caches of device 100 which are power-managed are flushed to a memory, such as RAM 140. According to embodiments, the duration of CacheFlush phase 208 is dependent upon the number of modified lines from the caches. For example, the duration of CacheFlush phase 208 will increase as the number of modified lines from the caches increases. During StateSave phase 210, the core architectural state of the system is copied into the main memory, according to an embodiment. The duration of StateSave phase 210 is state dependent and generally can last between 75 microseconds and 125 microseconds, in an embodiment. PowerGated phase 212 is the lowest possible power state, in which header or footer power transistors of device 100 are switched off. This effectively removes voltage from CPU cores 112 and its associated caches, for example. The latency of PowerGated phase 212 is dependent upon the length of the received idle event. StateRestore phase 214 is invoked upon exit of PowerGated phase 210. During StateRestore phase 214, the architectural state of CPU cores 112 which were copied during StateSave phase 210 is restored.

In general, the power-down process 200 is considered a fixed process. It is considered a fixed process because the execution of CacheFlush phase 208, StateSave phase 210, and PowerGated phase 212 does not begin until a predetermined or fixed amount of time elapses after receipt of an idle event. As discussed above, the predetermined amount of time which has elapsed after receipt of an idle event and before execution of CacheFlush phase 208, for example, is known as Pre-Flush phase 206. Using embodiments, the goal of Pre-Flush phase 206 is to filter out short duration idle events that can be detrimental to both performance and power while capturing longer duration idle events. In this way Pre-Flush phase 206 enables prediction of optimal times when device 100 may enter the power-down state based on characteristics of prior idle events. Therefore, embodiments convert power-down process 200 from a fixed process to a predictive process.

In general, the duration or latency of Pre-Flush phase 206 is set to a static value, such as 200 microseconds. However, such a static value is not optimal for all applications. As discussed above, each phase of power-down process 200 results in an energy overhead. The power-down process 200 can potentially save a significant amount of leakage energy, but because it is fixed, it can also lead to significant energy penalties. Every time a component of device 100 is powered-down or placed in an idle state, some energy is needed and utilized to turn the components off and then back on. If the device 100 needs to be turned back on soon after being powered-down, the energy cost associated with powering off and then powering back on is not offset by the leakage energy saved when the device 100 is in the powered-down state. In other words, if there are a large number of short duration idle events generated by client applications of device 100, then entering the idle/powered-down state for each of these idle events may result in a performance and energy loss because the system is not in the powered-down state long enough to reach the energy break-even point. The energy break-even point is the amount of time when the cumulative leakage energy savings equals the energy overhead. Such a negative impact to performance and energy can be exploited, for example, by malicious applications, such as a power virus.

Therefore, selection of an optimal pre-flush latency is helpful to avoiding unnecessary power consumption. An optimal pre-flush latency for Pre-Flush phase 206 depends on characteristics of individual applications, as well as behaviors within a given application. A given application can have a combination of short and long duration events, making a static pre-flush latency (even per application) less than optimal.

During execution of the power-down process 200, a wake-up event may interrupt the transition from one phase to another. The wakeup event may be generated by interrupt controller 124 and is an indication to turn on power to the power-managed components of device 100. For example, upon exit of CacheFlush phase 208 and prior to initiation of StateSave phase 210, a wake-up event may cause the system to exit the power-down process 200. Exiting of the power-down process 200 may result in an increased power-consumption, as discussed above. Embodiments dynamically adjust a pre-flush latency based on characteristics of the application. In this way, a power-down process of a device can be adaptive to characteristics of received idle events for each application and predict an optimal time to enter a powered-down state. Thus, scenarios in which there is an unnecessary leakage of power can be reduced.

Figure 3:
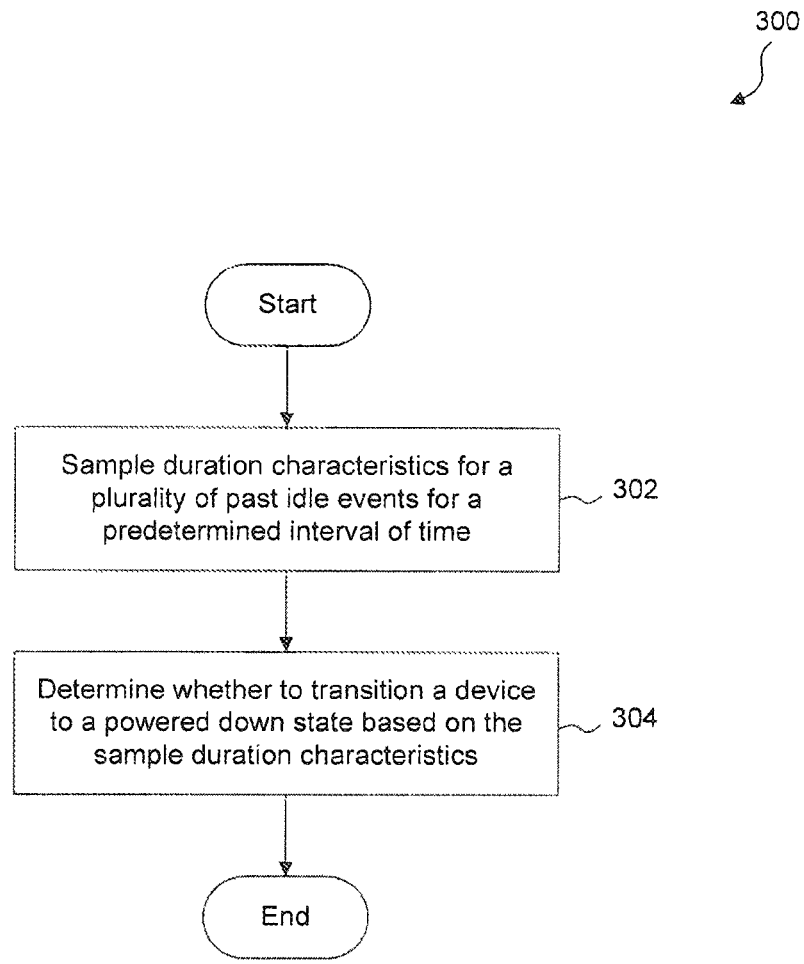
FIG. 3 is a flowchart of a method of power management, according to some embodiments.

FIG. 3 is a flowchart depicting an exemplary method 300, according to an embodiment. For ease of explanation, system 100 in FIG. 1 and power-down process 200 in FIG. 2 will be used to describe method 300, but embodiments are not intended to be limited thereto. In one example, method 300 can be used for dynamic power management of an accelerated processing device. The method 300 may not occur in the order shown, or require all of the steps.

At step 302, duration characteristics for a plurality of past idle events are sampled for a predetermined interval of time. For example, step 302 may be performed by PMC 122 of north bridge controller 120. Prior to determining whether to transition device 100 to a powered-down state, PMC 122 can be configured to analyze past idle events received from applications running on CPU module 110. For example, for a predetermined interval of time, such as, but not limited to, 50 microseconds, PMC 122 can implement a first counter (not illustrated in FIG. 1), which will count the number of idle events received. A second counter, such as a performance counter (not illustrated in FIG. 1), may then be instantiated to calculate a cumulative idle-event duration during the predetermined interval of time. For example, the cumulative idle event duration can be then calculated by aggregating the idle time for each idle event during the predetermined interval of time. The ratio between the cumulative idle time and the number of idle events may then be determined in order to identify an average idle duration for the predetermined interval of time. For example, during a 50 microsecond predetermined interval of time, 2 idle events may be received, with idle durations of 20 microseconds and 10 microseconds respectively. The average idle time duration of the received idle events is subsequently calculated by dividing the cumulative idle duration time (i.e., 20 microseconds+10 microseconds=30 microseconds) by the number of idle events received (i.e., 2). In the example above, the average idle duration time is calculated to be 15 microseconds.

At step 304, it is determined whether to transition a device to a powered-down state based on the determined duration characteristics. For example, step 304 may be performed by PMC 122 of north bridge controller 120. A determination of whether to transition a device to a powered-down state is based on the average idle time duration calculated during step 302, according to an embodiment. The average idle duration time can be compared against an energy break-even point threshold. In some embodiments, an energy break-even point is defined as the amount of time when the cumulative leakage energy savings equals the energy overhead during a powered-down state. If the average idle time for the plurality of past idle events exceeds the energy break-even point threshold, PMC 122 immediately initiates the transition of device 100 to the powered-down state, according to an embodiment. For example, device 100, will immediately begin the CacheFlush phase 208, StateSave phase 210, and PowerGated phase 212 of power-down process 200 (FIG. 2). The transition of device 100 to the powered-down state is immediately initiated upon receipt of a next idle event. In some embodiments, the immediate transition of device 100 to the powered-down state may mean that the device 100 begins the idle or powered-down process without waiting for any fixed or predetermined duration of time. In other embodiments, the immediate transition of device 100 to the powered-down state may mean that the device 100 begins the idle or powered-down process instantly upon receipt of a next idle event and independent of any fixed or predetermined duration of time. Since the average idle time duration of the plurality of past idle events exceeds the energy breakeven point threshold, PMC 122 predicts that the next idle event will also exceed the energy breakeven point threshold. This presents an opportunity for the device to be placed into a powered-down state without increased energy leakage. Based on the average idle duration time of past idle events, PMC 122 predicts that a wake-up event will not cause device 100 to prematurely exit the power-down process 200.

In an embodiment, if the average idle time for the plurality of past idle events does not exceed the energy break-even point threshold, transition of the device to the powered-down state is delayed. In such a scenario, PMC 122, by analyzing the duration characteristics of the past idle events, has determined that there is a strong likelihood that the next idle event will result in a premature exit of power-down process 200. As a result, it is not ideal for PMC 122 to initiate the powered-down state of device 100, since it is likely to result in an increased energy.

Figure 4:
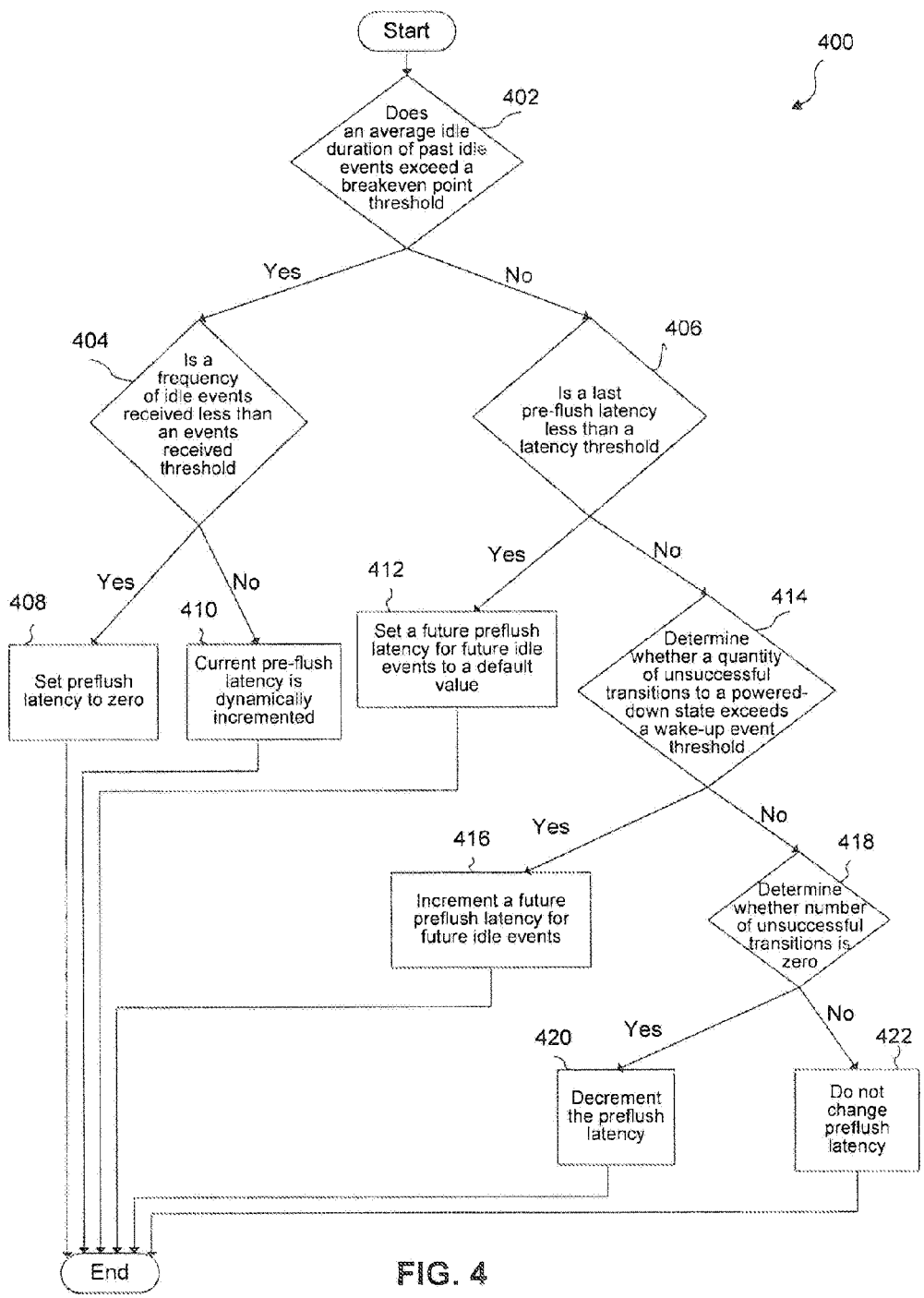
FIG. 4 is a flowchart of a method of dynamically adjusting a pre-flush latency, according to some embodiments.

PMC 122 is further configured to adjust a pre-flush latency based on further analysis of the characteristics of the past idle events, according to embodiments. FIG. 4 is a flow diagram illustrating the dynamic adjustment of a pre-flush latency according to embodiments. For ease of explanation, system 100 in FIG. 1 and power-down process 200 in FIG. 2 will be used to describe method 400, but embodiments are not intended to be limited thereto.

At step 402, an average idle duration of past idle events is compared to an energy breakeven point threshold. The operation of step 402 is similar to steps 302 and 304 of FIG. 3. If the average idle duration of past idle events exceeds the energy breakeven point threshold, method 400 proceeds to step 404. If the average idle duration of past idle events does not exceed the energy breakeven point threshold, method 400 proceeds to step 406.

At step 404, a frequency of idle events received is compared to an events received threshold. An events received threshold is the range or frequency of idle events received per second, in which PMC 122 determines it is optimal to power down device 100. If the frequency of idle events received does not exceed the events received threshold, a current pre-flush latency is set to zero, at step 408. The setting of the current pre-flush latency to zero immediately initiates the CacheFlush phase 208, StateSave phase 210, and PowerGated phase 212 of power-down process 200 (FIG. 2). In this way, if the frequency of idle events is relatively low or in other words the duration of each of the plurality of past idle events is not short, PMC 122 predicts that the next idle event will not have a short duration and the powered-down state is initiated immediately with a low risk of interruption by a wake-up event. However, frequent idle events during an interval provide a strong indication that each idle event is relatively short. As discussed previously, in some embodiments, the immediate initiation of power-down process 200 may mean that the idle or powered-down process begins without waiting for and independent of any fixed or predetermined duration of time.

If the frequency of idle events received exceeds the events received threshold, a current pre-flush latency is dynamically incremented at step 410. In such a scenario, although PMC 122 determines that the average idle duration time of the past idle events exceeds the energy breakeven point threshold (at step 402) there is still a possibility that a short duration event which does not exceed the energy breakeven point threshold may be the next received idle event due to the frequency of the events received per second. As discussed previously, a large number of short duration idle events and entering the idle/powered-down state for these short duration idle events may result in a performance and energy loss because device 100 is not in the powered-down state long enough to reach the energy break-even point. Thus, in order to reduce the performance impact on device 100 of a next event with a short idle time duration, PMC 122 is configured to increment the Pre-Flush latency by a predetermined value (i.e. 50 microseconds). In this way, PMC 122 dynamically adjusts the Pre-Flush latency of the power-down process 200 and this enables short duration idle events to be filtered out and not initiated.

Returning to step 402, if the average idle duration of past idle events does not exceed the energy breakeven point threshold, method 400 proceeds to step 406. At step 406, a last pre-flush latency associated with a last idle event is compared to a latency threshold. A latency threshold is a default value utilized for a Pre-Flush phase 206. The latency threshold may be considered the general optimal pre-flush latency value for device 100. If the last pre-flush latency associated with the last idle event does not exceed the latency threshold, method 400 proceeds to step 412, where a future pre-flush latency for future idle events is set to a default value or the latency threshold. For example, such a default value can be 200 microseconds, which is the pre-flush value generally used by a static power management device.

If the last pre-flush latency exceeds the latency threshold, method 400 proceeds to step 414, where it is determined whether a quantity of unsuccessful transitions to a powered-down state exceeds a wake-up event threshold. A wake-up event threshold is a range or frequency of wake-up events received during execution of a power-down process which results in an unsuccessful transition. The wake-up event threshold is utilized by PMC 122 to determine whether to adjust a pre-flush latency in order to increase leakage energy savings, according to an embodiment. An unsuccessful transition to a powered-down state occurs when a wakeup event is received during execution of CacheFlush phase 208, for example. In general, an unsuccessful transition to a powered-down state occurs any time power-down process 200 does not completely execute all of its phases prior to receiving a wake-up event according to embodiments. Additionally, an unsuccessful transition to a powered-down state occurs when the duration of the powered-down state is not long enough to reach the energy break-even point. If the quantity of unsuccessful transitions to a powered-down state exceeds a wake-up event threshold, then method 400 proceeds to step 416, where a future Pre-Flush latency for future idle events is incremented. For example, a future pre-flush latency for future idle events can be incremented by a predetermined value, in a similar manner as step 410 discussed above. In this way, once again the pre-flush latency is dynamically adjusted to filter out and stop execution of idle events with short durations.

If the quantity of unsuccessful transitions to a powered-down state does not exceed the wake-up event threshold, then method 400 proceeds to step 418, where it is determined whether an unsuccessful transition ever occurred. If an unsuccessful transition to a powered-down state did not occur, PMC 122 is configured to decrement the pre-flush latency at step 420. In an embodiment, when the quantity of unsuccessful transitions to a powered-down state is low or above or equal to a predetermined unsuccessful transitions threshold, a future pre-flush latency is decremented. For example, a predetermined unsuccessful transitions threshold can be set to 0. This is an indication that although the average idle duration of past idle events has not exceeded the energy breakeven point, there also has not been any premature exits of power-down process 200. Thus, PMC 122 determines that it could be beneficial to decrease the Pre-Flush latency in order to make sure suitable idle events (e.g., longer duration idle events) which can amortize energy costs are not filtered out unnecessarily. At step 418, if it is determined that there were unsuccessful transitions to a powered-down state, method 400 proceeds to step 422 where the pre-flush latency is not adjusted. At step 422, PMC 122 determines that the pre-flush latency should not be changed, since there does not appear to be a benefit to such a change based on characteristics of the past idle events.

The sampling time intervals, various thresholds, and pre-flush latency increment and decrement values are for illustrative purposes only. One of ordinary skill in the art would appreciate that many different combination of values may be used depending on the complexity of the system. Additionally, embodiments have been discussed with respect to PMC 122 of north bridge controller 120 performing power management. However, embodiments can be performed directly by any component of a device which may benefit from power management, such as a system management unit (SMU), CPU cores 112 of FIG. 1, hardware, system firmware, an operating system, etc.

In a further embodiment, a multi-level scheme may be used to enter a powered-down state. A multi-level scheme combines a fixed scheme and a bimodal scheme in order to determine when a powered-down state is initiated. As discussed previously, a fixed scheme delays entry of a system into powered-down state for a predetermined or fixed amount of time after receipt of an idle event (i.e., pre-flush latency). The fixed scheme delays execution of the powered-down state, in order to filter out the high frequency, low duration idle events. The fixed scheme works well when there are a mixture of short duration and longer duration idle events, as it allows the component to enter the powered-down state during longer duration idle events and filters out the short duration events.

A bimodal scheme is also configured to filter out short duration idle events. However, unlike the fixed scheme, which uses a pre-flush latency to filter out certain types of idle events, a bimodal scheme assumes that short duration idle events are clustered and arrive in bunches. Therefore, the approach taken by the bimodal scheme is to either enable or disable entry into the powered-down state based on the frequency of idle events. For example, a value of 5000 idle events/sec can be used as a trigger point or threshold for entering or disabling the powered-down state. The number of idle events can be measured for a predetermined interval of time in a similar manner as described previously. If the number of idle events is greater than or equal to 5000 idle events/sec, the powered-down state will not be entered and is disabled. Otherwise, the powered-down state is enabled and the system immediately initiates the power-down process. The use of the value of 5000 idle events/sec is purely exemplary, and not a limitation of the approach.

The multi-level scheme combines the characteristics of the fixed scheme with the disabling feature of the bimodal scheme, according to embodiments. According to an embodiment, during use of the multi-level scheme, the density (i.e., quantity) of idle events over a predetermined interval of time is used to determine a pre-flush latency. As the frequency of idle events increases, a larger pre-flush latency is utilized, according to an embodiments. On the other hand, as the frequency of idle events decreases, a smaller pre-flush latency is utilized. In this way, the power-down process is never completely disabled and the benefits of the fixed scheme and bimodal scheme are leveraged.

Figure 5:
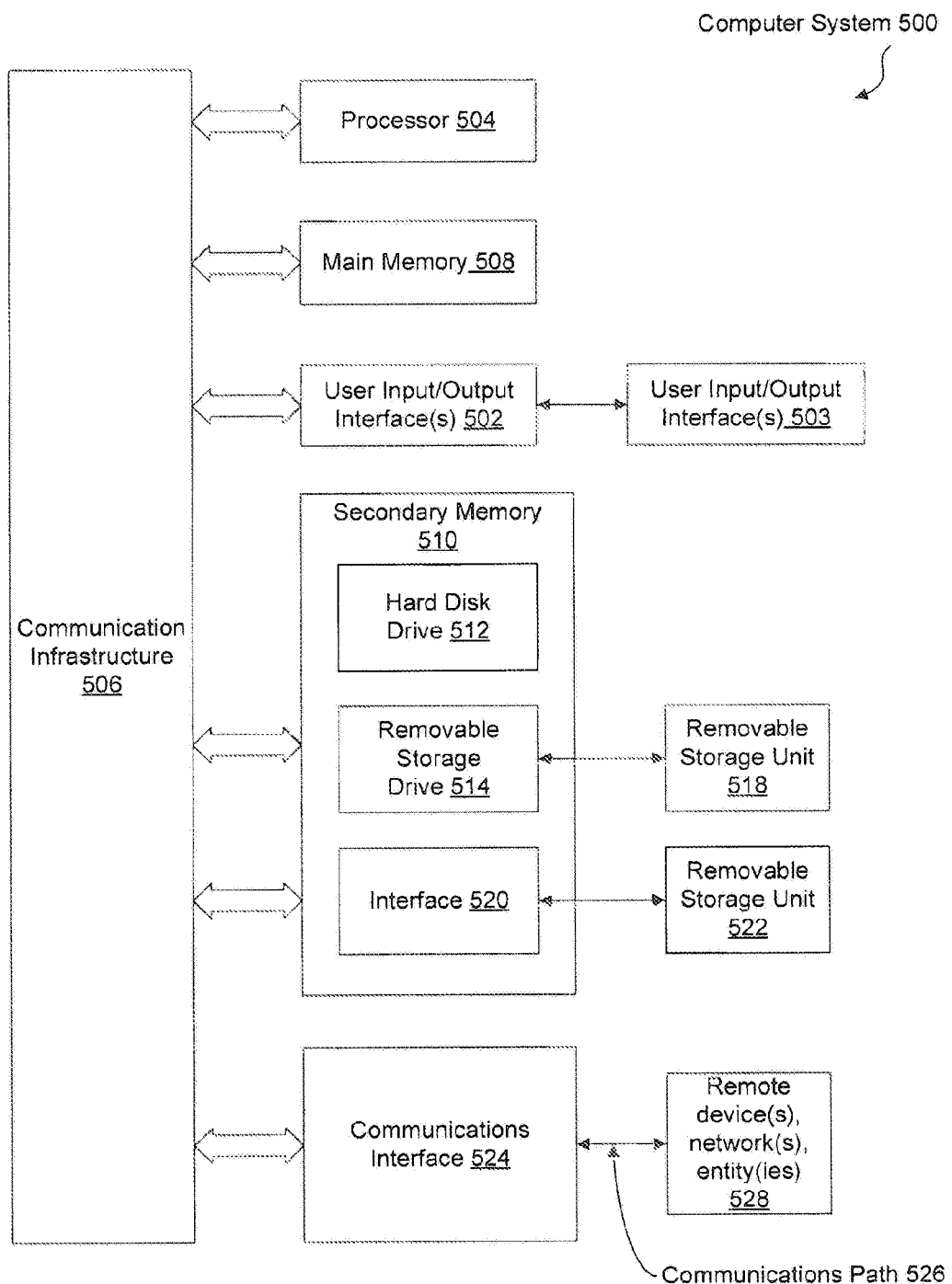
FIG. 5 illustrates an example computer system in which embodiments, or portions thereof, may be implemented as computer-readable code.

Various embodiments (e.g., PMC 122) can be implemented, for example, using one or more well-known computer systems, such as computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer usable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC, SystemC Register Transfer Level (RTL), and so on, or other available programs, databases, and/or circuit (i.e., schematic) capture tools. Such software can be disposed in any known computer usable medium or non-transitory computer-readable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present disclosure should not be limited by any of the above-described exemplary embodiments, but should be defined only in accordance with the following, claims and their equivalence.

Based on the teachings contained in this disclosure, it will be apparent to persons skilled in the relevant art(s) how to make and use the disclosed embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosed and contemplated embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method, comprising:
   sampling, by a power management controller, a device's duration characteristics for a plurality of past idle events for a predetermined interval of time, wherein the sampling comprises:
      determining a quantity of the plurality of past idle events for the predetermined interval of time; and
      determining an average idle time duration for the quantity of past idle events; and
   determining, by the power management controller, whether to transition the device to a powered-down state based on the sampled duration characteristics of the device, wherein determining whether to transition the device to the powered-down state comprises:
      determining whether the average idle time duration for the plurality of past idle events exceeds an energy break-even point threshold, wherein the energy break-even point threshold is an amount of time when a cumulative leakage energy savings equals an energy overhead during the powered-down state;
      if the average idle time duration for the plurality of past idle events exceeds the energy break-even point threshold, initiating the transition of the device to the powered-down state upon receipt of a next idle event, wherein initiating the transition of the device to the powered-down state comprises determining a frequency of the plurality of past idle events received and adjusting a current pre-flush latency for the next idle event based on the determined frequency; and
      if the average idle time duration for the plurality of past idle events does not exceed the energy break-even point threshold, delaying the transition of the device to the powered-down state.

2. The method of claim 1, wherein adjusting the current pre-flush latency comprises:
   setting the current pre-flush latency to zero if the determined frequency of the plurality of past idle events is less than an events received threshold; and
   incrementing the current pre-flush latency if the determined frequency of the plurality of past idle events exceeds the events received threshold.

3. The method of claim 1, wherein delaying the transition of the device to the powered-down state comprises:
   determining whether a last pre-flush latency of a last idle event received exceeds a latency threshold; and
   if the last pre-flush latency does not exceed the latency threshold, setting a future pre-flush latency for future idle events to a default value.

4. The method of claim 3, further comprising:
if the last pre-flush latency of the last idle event received exceeds the latency threshold:
determining whether a quantity of unsuccessful transitions to the powered-down state exceeds a wake-up event threshold; and
adjusting the future pre-flush latency for future idle events based on the determination whether the quantity of unsuccessful transitions to the powered-down state exceeds the wake-up event threshold.

5. The method of claim 4, wherein adjusting the future pre-flush latency comprises:
incrementing the future pre-flush latency if the quantity of unsuccessful transitions to the powered-down state exceeds the wake-up event threshold; and
if the quantity of unsuccessful transitions to the powered-down state does not exceed the wake-up event threshold:
decrementing the future pre-flush latency when the quantity of unsuccessful transitions to the powered-down state exceeds a predetermined unsuccessful transitions threshold.

6. A system comprising:
a power management controller configured to:
sample a device's duration characteristics for a plurality of past idle events for a predetermined interval of time, wherein the power management controller is further configured to determine a quantity of the plurality of past idle events for the predetermined interval of time and determine an average idle time duration for the plurality of past idle events based on the quantity; and
determine whether to transition a device to a powered-down state based on the sampled duration characteristics of the device, wherein the power management controller is further configured to determine whether the average idle time duration for the plurality of past idle events exceeds an energy break-even point threshold, the energy break-even point threshold being an amount of time when a cumulative leakage energy savings equals an energy overhead during the powered-down state, if the average idle time duration for the plurality of past idle events exceeds the energy break-even point threshold, initiate the transition of the device to the powered-down state upon receipt of a next idle event, wherein the power management controller is further configured to determine a frequency of the plurality of past idle events received and adjust a current pre-flush latency for a next idle event based on the determined frequency when initiating the transition of the device to the powered-down state, and if the average idle time for the plurality of past idle events does not exceed the energy break-even point threshold, delay the transition of the device to the powered-down state.

7. The system of claim 6, wherein the power management controller is configured to adjust a current pre-flush latency by being further configured to:
set the current pre-flush latency to zero if the determined frequency of the plurality of past idle events is less than an events received threshold; and
increment the current pre-flush latency if the determined frequency of the plurality of past idle events exceeds the events received threshold.

8. The system of claim 6, wherein the power management controller is configured to delay the transition of the device to the powered-down state by being further configured to:
determine whether a last pre-flush latency of a last idle event received exceeds a latency threshold; and
if the last pre-flush latency does not exceed the latency threshold, set a future pre-flush latency for future idle events to a default value.

9. The system of claim 8, wherein the power management controller is further configured to:
if the last pre-flush latency of the last idle event received exceeds the latency threshold:
determine whether a quantity of unsuccessful transitions to a powered-down state exceeds a wake-up event threshold; and
adjust the future pre-flush latency for future idle events based on the determination whether the quantity of unsuccessful transitions to the powered-down state exceeds the wake-up event threshold.

10. The system of claim 9, wherein the power management controller is configured to adjust the future pre-flush latency by being further configured to:
increment the future pre-flush latency if the quantity of unsuccessful transitions to a powered-down state exceeds the wake-up event threshold; and
if the quantity of unsuccessful transitions to a powered-down state does not exceed the wake-up event threshold: decrement the future pre-flush latency when the quantity of unsuccessful transitions to a powered-down state exceeds a predetermined unsuccessful transitions threshold.

* * * * *